(12) United States Patent
Lee

(10) Patent No.: US 10,907,749 B2
(45) Date of Patent: Feb. 2, 2021

(54) SOLENOID VALVE FOR CONTROLLING FLUID

(71) Applicant: YOUNGDO IND. CO., LTD., Busan (KR)

(72) Inventor: Kwang Ho Lee, Busan (KR)

(73) Assignee: YOUNGDO IND. CO., LTD., Busan (KR)

( * ) Notice: Subject to any disclaimer, the term of this patent is extended or adjusted under 35 U.S.C. 154(b) by 87 days.

(21) Appl. No.: 16/097,442

(22) PCT Filed: Apr. 25, 2017

(86) PCT No.: PCT/KR2017/004355
§ 371 (c)(1),
(2) Date: Oct. 29, 2018

(87) PCT Pub. No.: WO2017/196002
PCT Pub. Date: Nov. 16, 2017

(65) Prior Publication Data
US 2019/0154167 A1    May 23, 2019

(30) Foreign Application Priority Data
May 10, 2016 (KR) .................. 10-2016-0056998

(51) Int. Cl.
*F16K 31/06* (2006.01)
*F16K 31/10* (2006.01)
(Continued)

(52) U.S. Cl.
CPC ...... *F16K 31/0655* (2013.01); *F16K 31/0693* (2013.01); *F16K 31/10* (2013.01);
(Continued)

(58) Field of Classification Search
CPC .... F16K 31/0655; F16K 31/10; F16K 39/024; F16K 31/408; F16K 31/0689; F16K 1/36; F17C 13/04
See application file for complete search history.

(56) References Cited

U.S. PATENT DOCUMENTS 1,807,191 A * 5/1931 Boyle .................. F16K 31/408
                                                            137/490
2,624,542 A * 1/1953 Ghormley ................ F16K 1/46
                                                              251/332
(Continued)

FOREIGN PATENT DOCUMENTS

CA         2920997 A1 *  3/2015  ......... F16K 31/0665
DE   102011085533 A1 *  5/2013  ......... F16K 31/0689
(Continued)

OTHER PUBLICATIONS

International Search Report—PCT/KR2017/004355 dated Jul. 26, 2017.

*Primary Examiner* — Umashankar Venkatesan
(74) *Attorney, Agent, or Firm* — Cantor Colburn LLP

(57) ABSTRACT

Provided is a fluid control solenoid valve including: a valve body; a valve seat mounted on a lower portion thereof; a coil mounted on an outer circumferential surface thereof and to which power is applied; a core mounted on an inner surface thereof; a lower plunger movably disposed on the inner surface thereof and formed with an orifice and integrally formed with a tight contact portion to be in tight contact with the valve seat on a bottom surface thereof; and an actuating unit arranged to be linearly moved on an upper side of the lower plunger, actuated by interlocking the lower plunger and formed with an actuating rod which is linearly moved and which is in close contact with the orifice. A fluid flow delay unit is provided on an outer surface of the lower
(Continued)

plunger to generate pressure difference between upper and lower portions of the lower plunger.

8 Claims, 5 Drawing Sheets

(51) Int. Cl.
*F16K 31/40* (2006.01)
*F16K 39/02* (2006.01)
*F17C 13/04* (2006.01)
*F16K 1/36* (2006.01)

(52) U.S. Cl.
CPC .......... *F16K 31/408* (2013.01); *F16K 39/024* (2013.01); *F16K 1/36* (2013.01); *F16K 31/0689* (2013.01); *F17C 13/04* (2013.01)

(56) References Cited

U.S. PATENT DOCUMENTS

| | | | | |
|---|---|---|---|---|
| 3,100,103 | A * | 8/1963 | Bullard | F16K 31/408 |
| | | | | 251/30.03 |
| 5,048,790 | A * | 9/1991 | Wells | F16K 31/408 |
| | | | | 251/30.04 |
| 7,040,594 | B2 * | 5/2006 | Hironaka | B60T 8/363 |
| | | | | 251/129.07 |
| 2008/0023918 | A1 * | 1/2008 | Strasser | F16J 9/14 |
| | | | | 277/448 |
| 2013/0175462 | A1 * | 7/2013 | Suzuki | F16K 31/0655 |
| | | | | 251/30.01 |
| 2015/0184805 | A1 * | 7/2015 | Lee | F17C 13/04 |
| | | | | 137/544 |
| 2018/0209560 | A1 * | 7/2018 | Hwang | F16K 1/302 |

FOREIGN PATENT DOCUMENTS

| | | | | |
|---|---|---|---|---|
| DE | 102011087895 A1 * | 6/2013 | ......... | F16K 31/0689 |
| JP | 2001151097 | 6/2001 | | |
| JP | 2005133934 | 5/2005 | | |
| JP | 2016156485 A * | 9/2016 | ............. | F17C 13/00 |
| KR | 100428184 | 4/2004 | | |
| KR | 20110012263 | 2/2011 | | |
| KR | 20110116737 | 10/2011 | | |
| KR | 101112586 | 2/2012 | | |
| KR | 20130054376 | 5/2013 | | |
| KR | 20130136239 | 12/2013 | | |
| WO | WO-2013138144 A1 * | 9/2013 | ......... | F16K 31/0658 |
| WO | WO-2015125404 A1 * | 8/2015 | ......... | F16K 31/0655 |

* cited by examiner

SOLENOID VALVE FOR CONTROLLING FLUID

TECHNICAL FIELD

The present disclosure relates to a fluid control solenoid valve for controlling the flow of a raw material gas when filling the raw material gas stored in a high-pressure vessel into another high-pressure vessel or supplying the raw material gas to a gas consumer unit.

BACKGROUND ART

Currently, in the case of a hydrogen fuel cell system, a fluid control valve is provided in a high-pressure vessel storing a raw material gas to control the flow of the raw material gas when the raw material gas is charged into the high-pressure vessel, and to control the flow of the raw material gas, when the raw material gas stored in the high-pressure vessel is supplied to a gas consumer unit.

The fluid control valve can precisely control the flow of a raw material gas precisely according to an electric signal, keep the pressure of fluid stored in a pressure vessel to be constant, and prevent explosion of a high-pressure vessel when a hydrogen fuel cell vehicle overturns or a fire occurs therein.

As disclosed in Korean Patent Publication No. 10-0002586 (published on Jan. 30, 2012), a conventional solenoid valve includes: a housing; a valve core provided in the housing; a plunger provided so as to be able to move forward and backward in the housing; a packing member mounted on the plunger; and a valve seat opened and closed by the packing member, wherein the plunger has a first accommodating portion for fluidly accommodating the packing member, wherein the first accommodating portion has an inclination portion so that the packing member is provided so as to be inclined and mounted, wherein the packing member is disposed in parallel with an end of the valve seat in a state where the valve seat is closed, and the packing member is arranged so as to be inclined at a predetermined angle with respect to the valve seat, in a state where the valve seat is opened.

However, since the conventional solenoid valve is equipped with the packing member for opening and closing the valve seat at the end portion of the plunger, a process for mounting the packing member on the plunger is required, thereby complicating the manufacturing process. Further, since the packing member is formed of a rubber material, the packing member may tear due to a certain high pressure.

As disclosed in Korean Patent Publication No. 10-0428184 (published on Apr. 9, 2004), a solenoid valve installed in another conventional compressed natural gas storage tank includes: a valve housing connected to a gas pipe; a coil wound in the valve housing; and a piston unit for selectively opening a gas pipe connected to the storage tank while overcoming the force of a valve spring as electric power is applied to the coil. In addition, the piston unit includes: an upper piston made of a steel material, which is coupled to one end of the valve spring installed in the valve housing and moves linearly in the valve housing in a direction to open or shut off the gas pipe connected to the storage tank; a lower piston made of a steel material, which is fitted into and coupled to the upper piston in the longitudinal direction via a coupling shaft formed at one end thereof and interlocked with the upper piston; and an auxiliary piston made of a steel material, which is coupled to a lower surface of the lower piston so as to be axially rotatable, and interlocked with the upper piston to open or close the gas pipe connected to the storage tank.

In other conventional solenoid valves, since the upper piston and the lower piston are connected to each other by the coupling shaft, there is a risk of breakage due to a high pressure when the rigidity of the coupling shaft is weak, and since an auxiliary piston is rotatably installed below the lower piston, wear of the auxiliary piston may occur due to rotation of the auxiliary piston, which may result in breakage of the auxiliary piston, and malfunction and leakage of the solenoid valve may occur.

DISCLOSURE

Technical Problem

Accordingly, an object of the present disclosure is to provide a fluid control solenoid valve that delays the flow of fluid flowing into an outer gap of a lower plunger to generate a pressure difference between the upper and lower portions of the lower plunger, and to thus ensure smooth operation of the solenoid valve.

Another object of the present disclosure is to provide a solenoid valve for fluid control which solves a pressure difference between the outside and inside of an upper plunger so that an operation of the upper plunger can be smoothly performed.

It is a further object of the present disclosure to provide a solenoid valve for fluid control in which a valve member that is in close contact with an orifice of a lower plunger is disposed so as to be linearly movable in an inside of an upper plunger separately from an upper plunger to mitigate impact upon contact between the orifice and the valve member, to thereby prevent breakage of the solenoid valve.

Technical Solution

In order to achieve the above object, a fluid control solenoid valve according to the present disclosure comprises: a valve body; a valve seat mounted on a lower portion of the valve body; a coil mounted on an outer circumferential surface of the valve body and to which power is applied; a core mounted on an inner surface of the valve body; a lower plunger movably disposed on the inner surface of the valve body and formed with an orifice and integrally formed with a tight contact portion so as to be in tight contact with the valve seat on a bottom surface of the valve body; and an actuating unit which is arranged to be linearly moved on an upper side of the lower plunger, which is actuated by interlocking the lower plunger and which is formed with an actuating rod which is linearly moved and which is in close contact with the orifice, when power is applied to the coil and, wherein a fluid flow delay unit is provided on an outer surface of the lower plunger for delaying the flow of a fluid moving through a gap between the valve body and the lower plunger to generate a pressure difference between upper and lower portions of the lower plunger.

An inlet port through which a raw material gas enters and exits, is formed in a lower portion of the valve body, a first space portion on which the actuation unit is mounted is formed on an upper side thereof, and a second space portion on which the lower plunger is mounted, is formed on a lower side portion thereof so as to have a larger inner diameter than the first space portion.

The fluid flow delay unit includes: a groove formed on an outer surface of the lower plunger so as to be recessed in a circumferential direction; and a delay ring inserted in the groove and in contact with an inner wall surface of the valve body to block the gap between the valve body and the lower plunger, wherein the delay ring is movably mounted in the groove such that the flow of fluid is delayed by the delay ring.

The actuation unit includes: an upper plunger that is linearly movable on the valve body and that linearly moves when power is applied to the coil; a moving member that is linearly movably inserted into an inner surface of the upper plunger; a valve member which is actuated in association with the moving member, which is inserted in the inner surface of the upper plunger so as to be linearly movable, and which has the actuation rod for opening and closing the orifice at an end thereof; and a spring provided between the moving member and the core, to provide an elastic force so that the actuation rod is closely contact with the orifice.

The moving member is formed of a metal material, and the valve member is formed of a non-metal material so as to mitigate an impact when the actuation rod is in contact with the orifice.

The tight contact portion is formed on the lower surface of the lower plunger so as to be in close contact with the valve seat to open and close an exit port, the orifice is formed to be penetrated at a center portion of the lower plunger, so as to be opened and closed by the actuation rod, and an insertion groove portion into which the upper plunger is inserted is formed on the upper side of the lower plunger.

A latching pin is mounted on a lower outer surface of the upper plunger and a latching slot is formed on an upper side of the lower plunger so that the latching pin can be moved in the vertical direction within a predetermined range.

The upper plunger is formed with a fluid passage for relieving a pressure difference through which the fluid passes to eliminate the pressure difference between both the outside and the inside of the upper plunger.

The fluid passage for relieving pressure difference includes: a first fluid passage communicating between both the inside and the outside of the upper plunger; and a second fluid passage communicating between a chamber formed between the upper plunger and the lower plunger and an outside of the upper plunger.

Advantageous Effects

As described above, in the fluid control solenoid valve of the present disclosure, the groove is formed on the outer surface of the lower plunger, and the delay ring is movably installed in the groove to delay the flow of the fluid flowing into the gap between the lower plunger and the valve body so that a pressure difference is generated between both the upper and lower portions of the lower plunger and thus an operation of the valve can be smoothly performed.

Further, in the fluid control solenoid valve of the present disclosure, the fluid passage for relieving the pressure difference is formed in the upper plunger, thereby relieving the pressure difference between both the outside and the inside of the upper plunger so that the operation of the upper plunger can be smoothly performed.

In addition, in the solenoid valve for fluid control according to the present disclosure, a valve member closely attached to the orifice of the lower plunger is disposed so as to be linearly movable in the upper plunger separately from the upper plunger to mitigate the impact upon contact between the orifice and the valve member, to thereby prevent breakage of the solenoid valve.

BEST MODE

Figure 1:
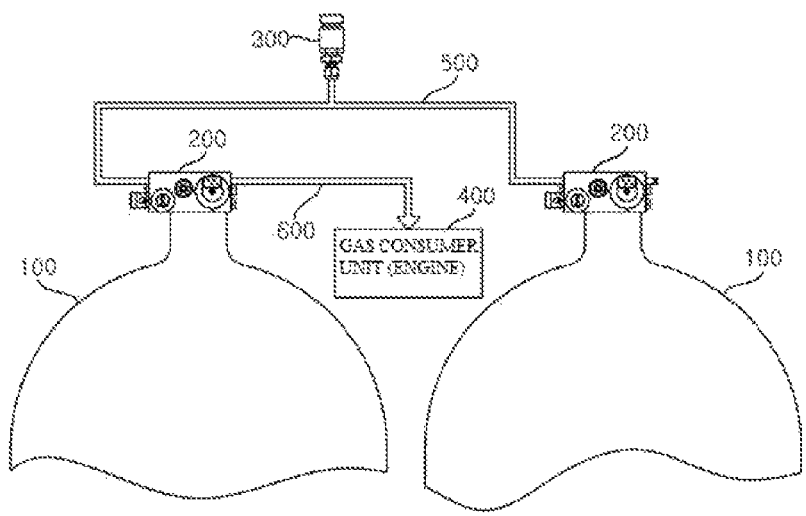
FIG. 1 is a configuration diagram of a fluid control system according to an embodiment of the present disclosure.

Hereinafter, embodiments of the present disclosure will be described in detail with reference to the accompanying drawings. The sizes and shapes of the components shown in the drawings may be exaggerated for clarity and convenience. In addition, terms defined in consideration of the configuration and operation of the present disclosure may vary depending on the intention or custom of the user, the operator, and the like. Definitions of these terms should be based on the content of this specification.

FIG. 1 is a configuration diagram of a fluid control system according to an embodiment of the present disclosure.

The fluid control system according to one embodiment includes: at least one high-pressure vessel 100 in which a raw material gas is stored; a fluid control valve assembly 200 mounted at an inlet port of the at least one high-pressure vessel 100 to control the fluid; a raw material gas filling port 300 connected to the fluid control valve assembly 200 via a first pipe 500 to fill the high pressure vessel 100 with the raw material gas; a gas consumer unit 400 connected to the fluid control valve assembly 200 via a second pipe 600 for using the raw material gas stored in the at least one high-pressure vessel 100.

Such a fluid control system according to the present embodiment is mainly installed in a hydrogen fuel cell vehicle and is used for controlling the flow of a hydrogen raw material and can be applied to any system for charging and supplying a high pressure fluid in addition to the hydrogen fuel cell vehicle.

The high-pressure vessel is a vessel that can sufficiently secure storage of a raw material gas 700 bars or more.

The fluid control valve assembly 200 serves to supply the raw material gas stored in the high-pressure vessel 100 to the gas consumer unit 400 and to control the flow of the raw material gas when the raw material gas is charged into the high-pressure vessel 100.

Figure 2:
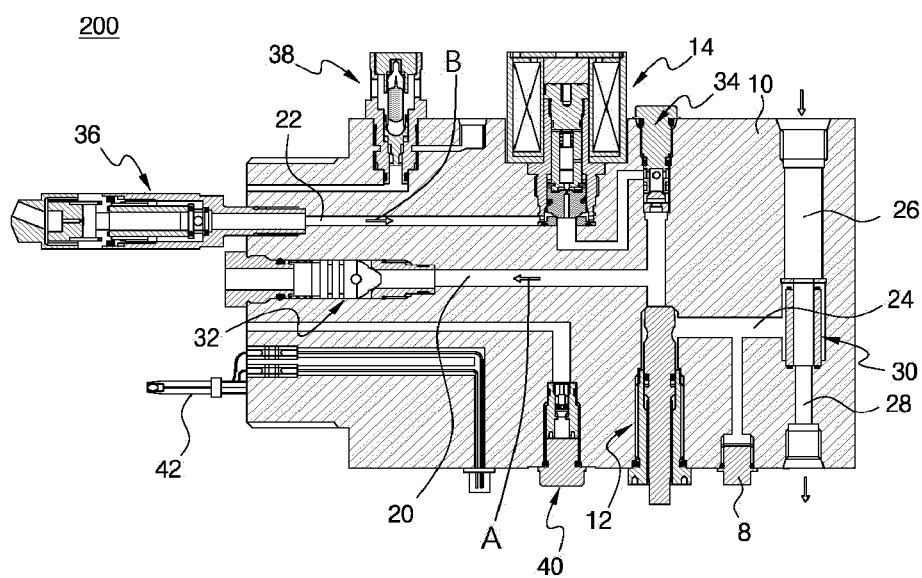
FIG. 2 is a cross-sectional view of a fluid control valve assembly according to an embodiment of the present disclosure.

FIG. 2 is a cross-sectional view of a fluid control valve assembly according to an embodiment of the present disclosure.

The fluid control valve assembly 200 according to one embodiment includes: a main valve body 10 mounted at an inlet port of a high-pressure vessel 100 filled with a raw material gas and having a plurality of valves and a plurality of flow paths formed therein; a manual valve 12 installed in the main valve body 10 for manually opening and closing the flow paths; and a solenoid valve 14 installed in the main valve body 10 for automatically opening and closing the flow paths according to an electrical signal.

The main valve body 10 includes: a first flow path 20 connected to a high-pressure vessel and through which a raw material gas for charging to be charged in the high-pressure vessel 100 passes; a second flow path 22 connected to the high-pressure vessel 100, and through which a raw material gas for supplying passes; and a third flow path 24 which the first flow path 20 and the second flow path 22 communicate.

The main valve body 10 is formed with a fourth flow path 26 connected to the raw gas filling port 300 and through which the raw material gas flows, and a fifth flow path 28 connected to the raw material gas consumer unit 400 to supply the raw material gas to the raw material gas consumer unit 400, in which the fourth flow path 26 and the fifth flow path 28 are communicated with the third flow path 24.

A filter 30 for filtering fine dust contained in the raw material gas is provided at a point where the fourth flow path 26 and the fifth flow path 28 meet and a porous sintered filter of 10 μm is used for the filter 30. Since the sintered filter made of a metal material is used for the filter 30 of the present embodiment, it is possible to prevent the filter from being damaged by the pressure of the raw material gas, and the lifetime of the filter can be increased.

The first flow path 20 is provided with a first check valve 32 for opening the flow of the raw material gas for charging to be charged into the high-pressure vessel 100 in a first direction (i.e., the direction of an arrow A) and blocking the flow in a reverse direction, and the second flow path 22 is provided with a second check valve 34 for opening the flow of the raw material gas for supplying to be supplied to the gas consumer unit 400 in a second direction (i.e., the direction of an arrow B) and blocking the flow in a reverse direction, to thus block the raw material gas for charging from flowing into an automatic valve 14.

The solenoid valve 14 is a valve that is installed in the second flow path 22 and that automatically opens and closes the second flow path 22 in accordance with an electrical signal and is provided on a front side of the second check valve 34.

As described above, the first flow path 20 through which the raw material gas for charging flows and the second flow path 22 through which the raw material gas for supply flows are separately formed in the main valve body 10 according to the present embodiment. The automatic valve 14 is provided in the second flow path 22 so that, when the raw material gas is charged into the high-pressure vessel, the second check valve 34 blocks the second flow path 22, to prevent the raw material gas for charging from flowing into the solenoid valve 14, and the solenoid valve 14 from being damaged by the high-pressure filling pressure.

Therefore, since the solenoid valve 14 is not affected by the filling pressure of the raw material gas for charging, it can be prevented from malfunctioning and durability deterioration can be prevented, and the lifetime of the solenoid valve can be extended.

A manual valve 12 is installed in the third flow path 24 and serves to open and close the third flow path 24 manually. That is, since the manual valve 12 opens and closes the third flow path 24, it functions to open and close the flow of the raw material gas discharged from the high-pressure vessel 100 and the flow of the raw material gas charged into the high-pressure vessel.

An excess flow valve 36 is provided at an inlet port of the second flow path 22 to block an abnormal excessive flow-out of the raw material gas stored in the high-pressure vessel 100. That is, when a pipe of a vehicle is disconnected in the event of a vehicle accident or rollover, the excess flow valve 36 is dangerous if the raw material gas in the high-pressure vessel 100 is instantly released to the outside, and thus the second flow path 22 is blocked in the event of an excess flow, thereby preventing vehicle accidents.

The main valve body 10 is provided with a pressure relief device for releasing the raw material gas in the high-pressure vessel 100 to the outside and preventing the high-pressure vessel from exploding when the temperature of the high-pressure vessel increases in the event of a fire due to vehicle accidents, and a bleed valve 40 for discharging the raw material gas in the high-pressure vessel 100 to the outside.

A thermistor 42 for measuring the temperature of the raw material gas stored in the high-pressure vessel 100 and applying the temperature signal to a control unit is installed at one side of the main valve body 10.

The main valve body 10 is provided with a branch flow path 6 in communication with the third flow path 24 and through which the raw material gas flows through the third flow path 24, and a pressure sensor 8 for measuring pressure installed in the branch flow path 6.

Figure 3:
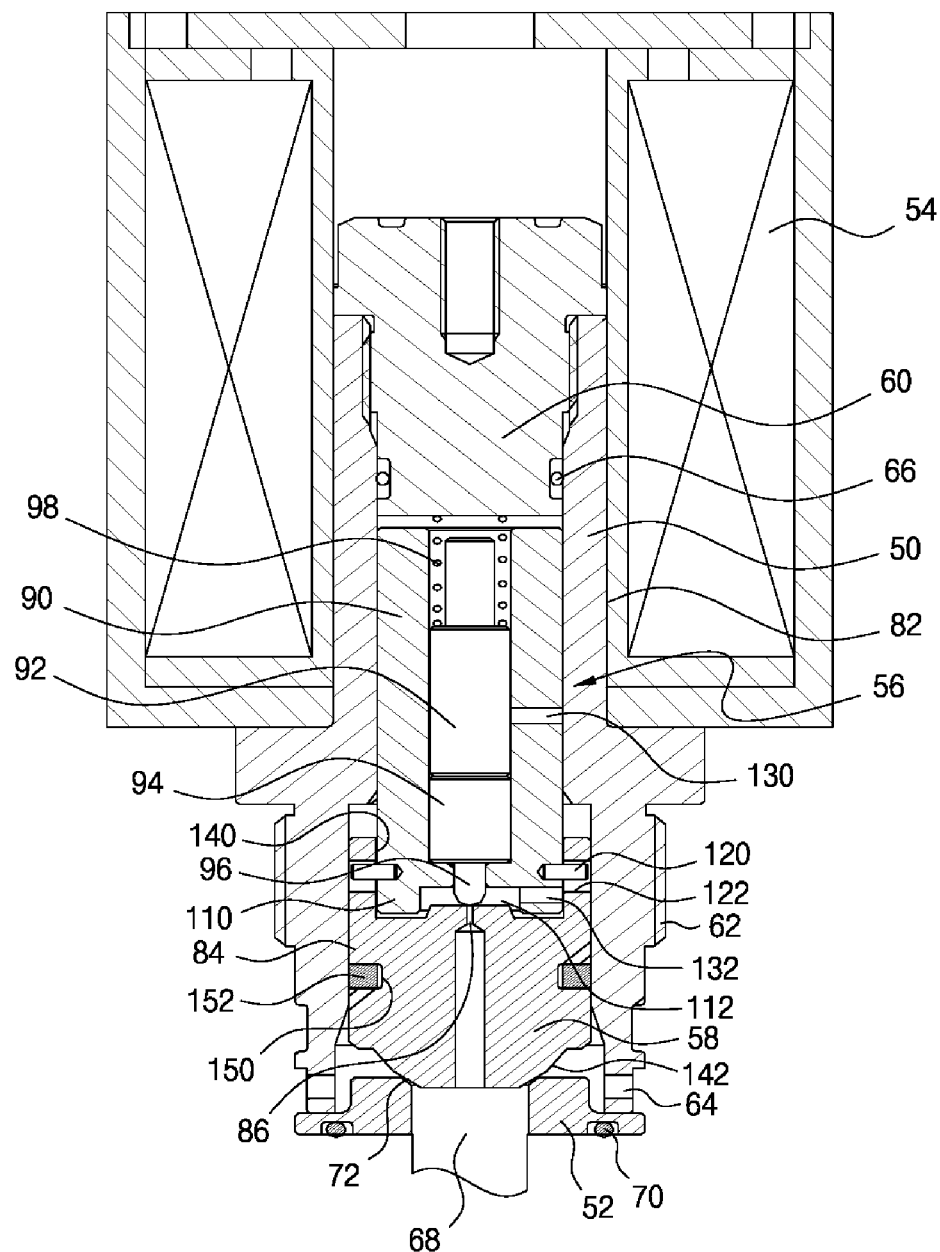
FIG. 3 is a cross-sectional view of a solenoid valve according to an embodiment of the present disclosure.
Figure 4:
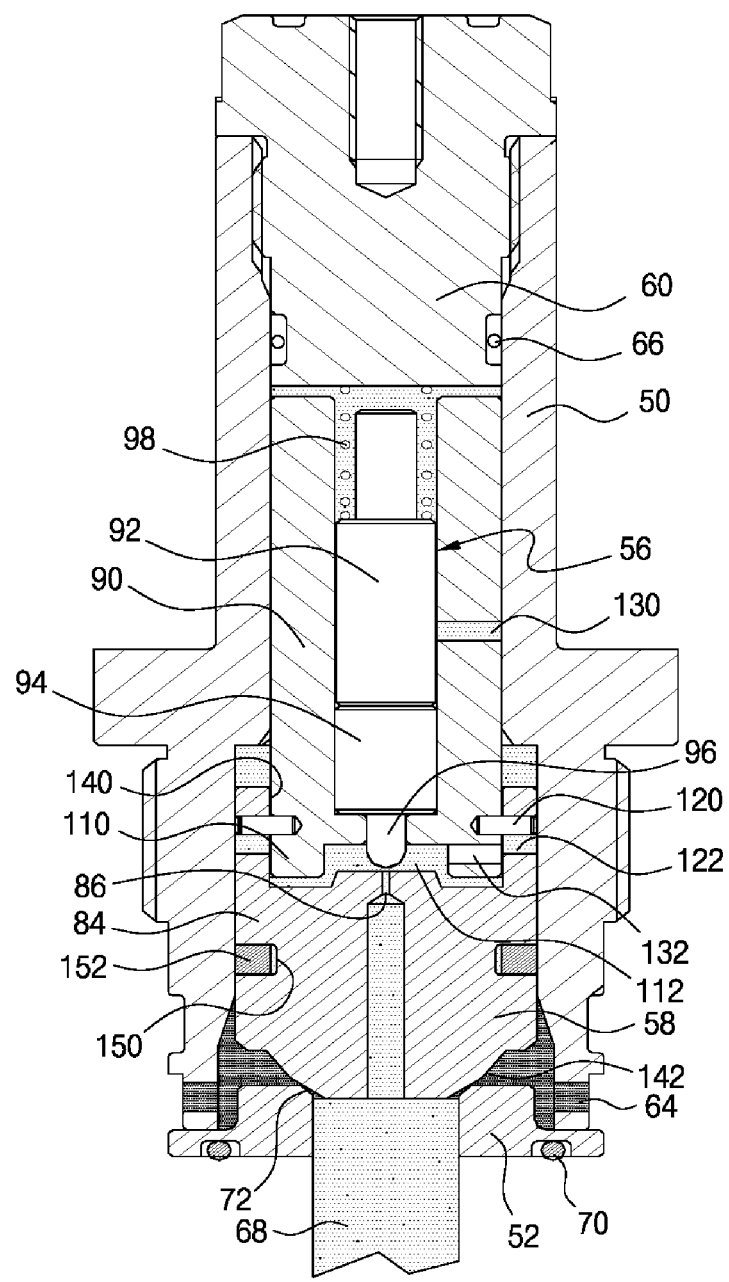
FIGS. 4 to 6 are cross-sectional views for illustrating operational states of a solenoid valve according to an embodiment of the present disclosure.
Figure 5:
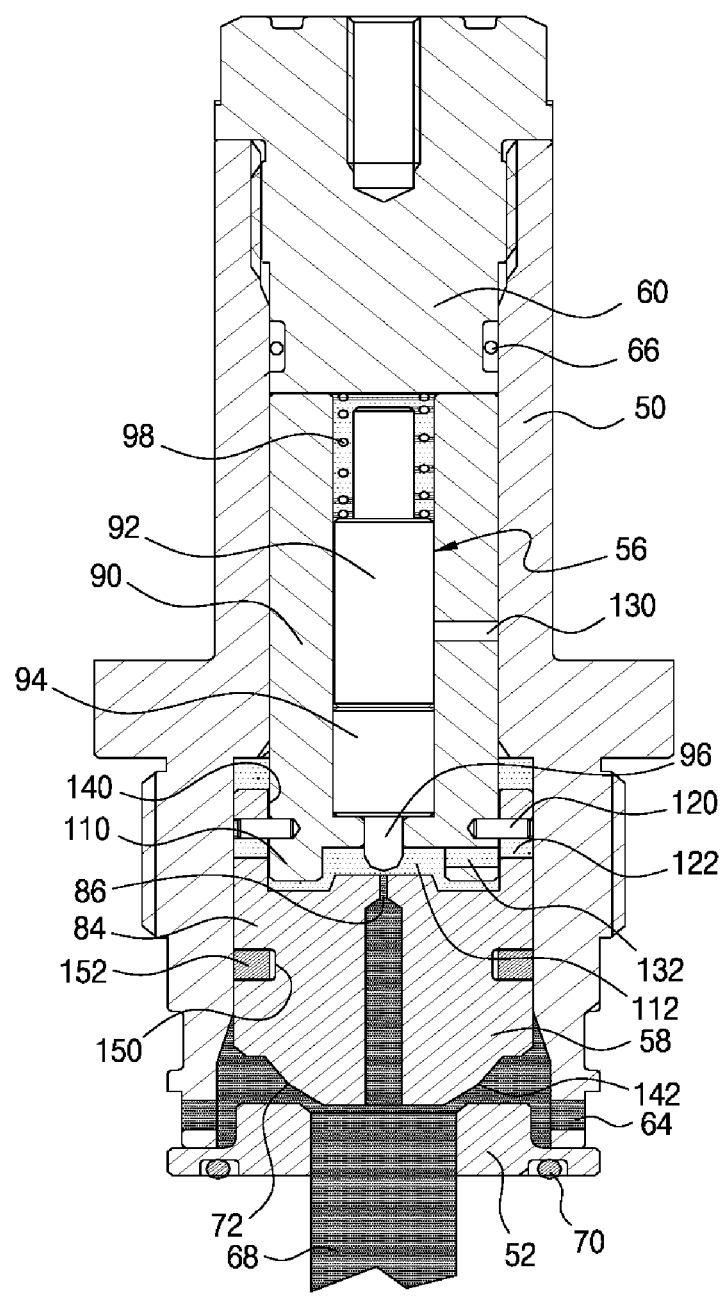
Figure 6:
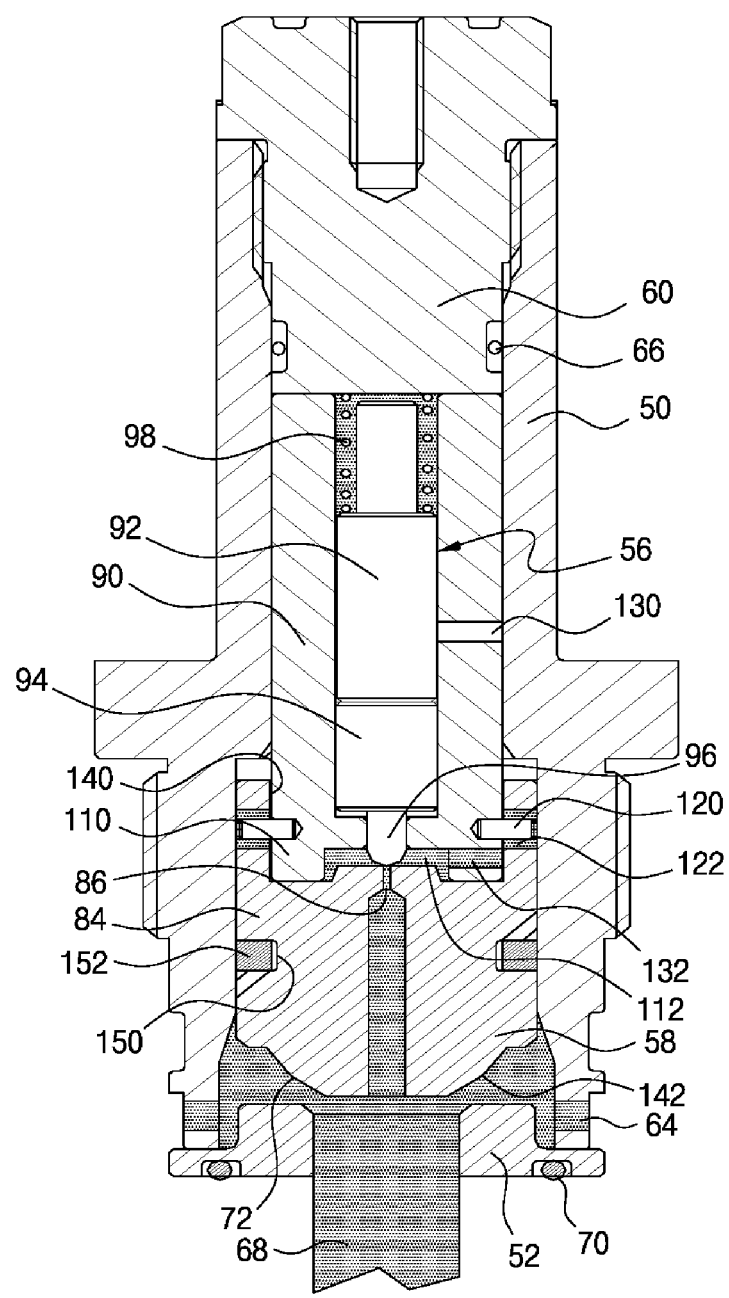

FIG. 3 is a cross-sectional view of a solenoid valve according to an embodiment of the present disclosure. FIGS. 4 to 6 are cross-sectional views for illustrating operational states of a solenoid valve according to an embodiment of the present disclosure.

The solenoid valve 14 is a valve that automatically opens and closes the second flow path 22 when power is applied thereto, and includes: a valve body 50 mounted on the main valve body 10; a valve seat 52 mounted on a lower portion of the valve body 50 and communicated with the second flow path 22, a coil 54 which is mounted on the outer circumferential surface of the valve body 50 and to which power is applied; an actuation unit 56 which is mounted on the inner circumferential surface of the valve body 50 so as to be linearly movable and which is linearly moved by interaction with the coil 54 when power is applied to the coil 54; and a lower plunger 58 which is operated in association with the actuation unit 56 and brought into close contact with a valve seat 52.

The valve body 50 is formed in a cylindrical shape with its upper and lower surfaces opened. The upper surface of the valve body 50 is fitted with a core 60 for sealing the upper surface of the valve body 50. The lower outer circumferential surface of the valve body 50 is formed with a screw coupling portion 62 which is screwed with the main valve body 10. An inlet port 64 communicating with the second flow path 22 and through which the raw material gas enters and exits is formed on the lower side surface of the valve body 50.

The core 60 is screwed on the upper portion of the valve body 50 and a first seal ring 66 is mounted on the outer circumferential surface thereof to prevent fluid from flowing out.

The inside of the valve body 50 has a first space portion 82 in which the actuation unit 56 is mounted and a second space portion 84 in which the lower plunger 58 is mounted, and which is formed to have a larger inner diameter than the first space portion 82.

The valve seat 52 is formed with an exit port 68 which is fixed to the lower surface of the valve body 50 and through which the raw material gas is discharged. A second seal ring 70 which is in close contact with the main valve body 10 to maintain sealability is mounted on the lower surface of the valve seat 52. A seat portion 72 in the shape of an inclined surface in contact with the lower plunger 58 is formed on the inner surface of the upper end of the exit port 68 of the valve seat 52.

The actuation unit 56 includes: an upper plunger 90 that is linearly movable in the first space portion 82 of the valve body 50 and linearly moves when power is applied to the coil 54; a moving member 92 which is inserted into the inner surface of the upper plunger 90 so as to be linearly movable; a valve member 94 which is operated in association with the moving member 92 and is linearly movably inserted into the inner surface of the upper plunger 90, provided with an actuation rod 96 for opening and closing an orifice at an end thereof; and a spring 98 provided between the moving member 92 and the core 60 to provide an elastic force such that the actuation rod 96 is brought into close contact with the orifice 86.

A partition wall portion 110 protruding in the circumferential direction is formed at the lower end of the upper plunger 90 inserted into the lower plunger 58 and a chamber 112 in which fluid flows is formed between the upper plunger 90 and the lower plunger 58.

A latching pin 120 is formed with on a lower outer surface of the upper plunger 90 and a latching slot 122 through which the latching pin 120 is inserted and hooked is formed on an upper side of the lower plunger 58. Here, the latching slot 122 is formed to secure a predetermined space in the vertical direction so that the latching pin 120 can be moved within a preset range of the latching slot 122 in the vertical direction.

Thus, the upper plunger 90 and the lower plunger 58 are caught by the latching pin 120 and prevented from being separated from each other.

The upper plunger 90 is formed with fluid passages 130 and 132 for relieving the pressure difference of the fluid flowing into a space between both the outer surface and the inner surface of the upper plunger 90. That is, when the fluid flows into the valve body 50, the fluid flows into a gap between the outer surface of the upper plunger 90 and the inner surface of the valve body 50 and a gap between the inner surface of the upper plunger 90 and the moving member 92.

Here, when the pressure of the fluid introduced into the outer portion of the upper plunger 90 and the pressure of the fluid introduced into the inner portion of the upper plunger 90 are different from each other, the pressure difference interferes with the linear movement of the upper plunger 90, and thus the initial operation of the upper plunger 90 is inaccurate to cause a problem that the operation of the valve is not precise.

In the present disclosure, the upper plunger 90 is provided with fluid passages 130 and 132 for relieving a pressure difference by communicating the inside and the outside with each other, so that both the internal pressure and the external pressure of the upper plunger 90 are always the same to thereby improve an operability of the upper plunger 90.

The fluid passages 130 and 132 for relieving the pressure difference include: a first fluid passage 130 formed so that both the outside and the inside of the upper plunger 90 are communicated with each other and a second fluid passage 132 formed in the partitioning wall portion 110 so that the outside of the upper plunger 90 and the chamber 112 are communicated with each other.

In the conventional solenoid valve, an actuation rod is formed on the upper plunger so that the actuation rod directly contacts the lower plunger. In this case, when a high pressure is applied to the upper plunger, the actuation rod of the upper plunger is strongly impacted to the lower plunger. When the actuation rod of the upper plunger repeatedly contacts the lower plunger with high pressure for opening and closing the orifice, the actuation is damaged and the lower plunger is also deformed by the impact, to thereby cause a problem that the orifice hole is clogged.

In order to solve this problem of the present disclosure, the valve member 94 for opening and closing the upper plunger 90 and the orifice 86 is separated, and the valve member 94 is disposed linearly movably on the inner surface of the upper plunger 90. The moving member 92 having high durability is disposed on the valve member 94 so that the valve member 94 is brought into contact with the orifice to prevent the upper plunger 90 and the lower plunger 58 from being damaged.

Here, the moving member 92 is formed of a strongly durable metal material, and the valve member 94 is formed of a non-metal material so as to prevent an impact from being generated upon contact with the lower plunger 58.

The lower plunger 58 is disposed linearly movably in the second space portion 84 of the valve body 50. An insertion groove portion 140 into which the upper plunger 90 is inserted formed on an upper surface of the lower plunger, and a tight contact portion 142 adhering to the valve sheet 52 is formed on a lower surface thereof.

An orifice 86, which is opened and closed by the actuation rod 96, is formed penetratively at the center of the lower plunger 58.

The latching pin 120 fixed to the upper plunger 90 is hooked to the insertion groove 140 so that the latching slot 122 connecting between the upper plunger 90 and the lower plunger 58 is formed in the vertical direction, and the latching pin 120 is moved in the latching slot 122 within a preset range in the vertical direction.

The lower plunger 58 is provided with a fluid flow delay unit denoted by reference numerals 150 and 152 for delaying the flow of the fluid flowing into a gap between the outer surface of the lower plunger 58 and the inner surface of the valve body 50.

The fluid flow delay unit includes a groove 150 formed on the outer surface of the lower plunger in the circumferential direction and a delay ring 152 inserted into the groove 150 and contacting the inner surface of the valve body 50.

Here, the delay ring 152 is inserted into the groove 150 so as to be flowable so as to delay the flow of the fluid flowing into the outer surface of the lower plunger 58, to thereby generate a pressure difference between the upper and lower portions of the lower plunger 58.

As described above, as the flow of the fluid introduced into the lower portion of the lower plunger 58 is delayed by the delay ring 152 toward the upper portion of the lower plunger 58, a pressure difference is generated between both the upper portion and the lower portion of the lower plunger 58, and the lower plunger 58 can be actuated by a pressure difference before the actuation by the electrical signal of the coil, so that the actuation of the lower plunger 58 can be smoothly performed.

The operation of the solenoid valve according to one embodiment of the present disclosure thus constructed will be described below.

First, as shown in FIG. 3, the lower plunger 58 is brought into close contact with the valve seat 52 and the actuation rod 96 is brought into close contact with the orifice 86 by the elastic force of the spring 98, and thus the second fluid path 22 is closed.

In this state, as shown in FIG. 4, when the coil 54 is energized, the upper plunger 90 is lifted and the valve member 94 inserted into the upper plunger 90 is lifted, and accordingly the orifice 86 is opened.

Then, the high-pressure fluid filled in the chamber 112 is discharged through the orifice 86, and the fluid filled in the outside and inside of the chamber 112 and the upper plunger 90 is brought into a low-pressure state.

Here, the inner and outer pressures of the upper plunger 90 are equalized by the fluid passages 130 and 132 formed in the upper plunger 90 at the time of linear movement of the upper plunger 90, movement of the upper plunger 90 is smoothly performed.

Further, as shown in FIG. 5, the high-pressure fluid filled in the lower portion of the lower plunger 58 is delayed by the delay ring 152 at a time of moving the fluid to the upper portion of the lower plunger 58, and the pressure difference is momentarily generated between both the upper and lower portions of the lower plunger 58. According to the pressure difference, the lower plunger 58 is moved prior to the movement in accordance with the electrical signal of the coil 54 to thus open the exit port 68 of the valve seat 52.

As described above, since the lower plunger 58 is moved by the pressure difference between the upper and lower portions of the lower plunger 58 before the pulling force of the upper plunger 90 by the electric signal of the coil 54 acts on the lower plunger 58, the movement of the lower plunger 58 is smoothly performed and thus the valve operation can be smoothly performed.

In addition, as shown in FIG. 6, a high-pressure fluid acting on the lower portion of the lower plunger 58 acts on the upper portion of the lower plunger 58 to urge the high-pressure fluid to be acted entirely on the lower plunger 58 and the upper plunger 90 and the exit port 68 is opened to allow the fluid to pass through the second flow path 22.

While the present disclosure has been particularly shown and described with reference to exemplary embodiments thereof, by way of illustration and example only, it is clearly understood that the present disclosure is not to be construed as limiting the present disclosure, and various changes and modifications may be made by those skilled in the art within the protective scope of the invention without departing off the spirit of the present disclosure.

INDUSTRIAL APPLICABILITY

According to the present disclosure, a fluid control solenoid valve is provided in a high-pressure vessel storing a raw material gas in a hydrogen fuel cell system to control a flow of the raw material gas when filling the raw material gas with the high-pressure vessel, so that the operation of the fluid control solenoid valve can be smoothly performed, and the fluid control solenoid valve can be prevented from being damaged by the pressure of the fluid.

What is claimed is:
1. A fluid control solenoid valve comprising:
a valve body;
a valve seat mounted on a lower portion of the valve body;
a coil mounted on an outer circumferential surface of the valve body and to which power is applied;
a core mounted on an inner surface of the valve body;
a lower plunger movably disposed on an inner surface of the valve body and formed with an orifice and integrally formed with a tight contact portion so as to be in tight contact with the valve seat on a bottom surface of the valve body;
an actuating unit which is arranged on an upper side of the lower plunger, the actuating unit including an actuating rod, wherein the actuating rod is configured to open and close the orifice of the lower plunger by linear movement of the actuating unit; and
a fluid flow delay unit comprising: a groove formed on an outer surface of the lower plunger so as to be recessed in a circumferential direction; and a delay ring flowably inserted in the groove and in contact with an inner wall surface of the valve body, wherein the delay ring is configured to move inside the groove, to delay a flow of a fluid moving through a gap between the valve body and the lower plunger, and thereby generate a pressure difference between upper and lower portions of the lower plunger.

2. The fluid control solenoid valve of claim 1, wherein an inlet port through which a fluid enters is formed in a lower portion of the valve body, a first space portion on which the actuation unit is mounted is formed on an upper side of the valve body, and a second space portion on which the lower plunger is mounted is formed on a lower side portion of the valve body, the second space portion having an inner diameter larger than that of the first space portion.

3. The fluid control solenoid valve of claim 1, wherein the actuation unit comprises:
an upper plunger that is linearly movable on the valve body and that linearly moves when power is applied to the coil;
a moving member that is linearly movably inserted into an inner surface of the upper plunger;
a valve member which is actuated in association with the moving member, is inserted in the inner surface of the upper plunger so as to be linearly movable, and has the actuation rod at an end thereof; and
a spring provided between the moving member and the core to provide an elastic force.

4. The fluid control solenoid valve of claim 3, wherein the moving member is formed of a metal material, and the valve member is formed of a non-metal material so as to mitigate an impact when the actuation rod is in contact with the orifice.

5. The fluid control solenoid valve of claim 3, wherein the tight contact portion is formed on the lower surface of the lower plunger so as to be in close contact with the valve seat to open and close an exit port, the orifice is formed to be penetrated at a center portion of the lower plunger, and an insertion groove portion into which the upper plunger is inserted is formed on the upper side of the lower plunger.

6. The fluid control solenoid valve of claim 5, wherein a latching pin is mounted on a lower outer surface of the upper plunger and a latching slot is formed on an upper side of the lower plunger so that the latching pin can be moved in vertical direction within a predetermined range.

7. The fluid control solenoid valve of claim 5, wherein the upper plunger is formed with a fluid passage for relieving a pressure difference between an outside and an inside of the upper plunger.

8. The fluid control solenoid valve of claim 7, wherein the fluid passage for relieving pressure difference comprises: a first fluid passage communicating between both the inside and the outside of the upper plunger; and a second fluid passage communicating between a chamber formed between the upper plunger and the lower plunger.

* * * * *